United States Patent
Soerensen et al.

(10) Patent No.: US 7,807,242 B2
(45) Date of Patent: Oct. 5, 2010

(54) TRANSPARENT, FLEXIBLE, IMPERMEABLE PLASTIC CONTAINER FOR STORAGE OF PHARMACEUTICAL LIQUIDS

(75) Inventors: Anne Soerensen, Holte (DK); Philip Albert Sparholt, Smørum (DK); Marianne Rye Hansen, Hellerup (DK)

(73) Assignee: Novo Nordisk A/S, Bagsvaerd (DK)

(*) Notice: Subject to any disclaimer, the term of this patent is extended or adjusted under 35 U.S.C. 154(b) by 913 days.

(21) Appl. No.: 11/472,831

(22) Filed: Jun. 22, 2006

(65) Prior Publication Data
US 2007/0014951 A1    Jan. 18, 2007

Related U.S. Application Data

(63) Continuation of application No. PCT/DK2004/000890, filed on Dec. 20, 2004.

(60) Provisional application No. 60/536,375, filed on Jan. 14, 2004.

(30) Foreign Application Priority Data
Dec. 22, 2003  (DK) .............................. 2003 01916

(51) Int. Cl.
B29D 22/00    (2006.01)
B29D 23/00    (2006.01)
B32B 1/08     (2006.01)

(52) U.S. Cl. .................. 428/35.7; 428/35.2; 62/60; 206/438; 206/570; 206/828; 383/110; 383/113

(58) Field of Classification Search ............. 428/35.2, 428/35.7, 36.6, 36.7; 62/60; 64/457.9; 206/438, 206/570, 828; 383/110, 113
See application file for complete search history.

(56) References Cited

U.S. PATENT DOCUMENTS

| | | | |
|---|---|---|---|
| 3,087,491 A | 4/1963 | Geweck et al. |
| 3,403,064 A | 9/1968 | Bellamy |
| 4,212,299 A | 7/1980 | Yokokoji et al. |
| 4,874,386 A | 10/1989 | O'Boyle |
| 5,000,739 A | 3/1991 | Kuisz et al. |
| 5,176,634 A | 1/1993 | Smith et al. |
| 5,205,820 A | 4/1993 | Kriesel |
| 5,722,957 A | 3/1998 | Steinbach |
| 5,833,070 A | 11/1998 | Mizuno et al. |

(Continued)

FOREIGN PATENT DOCUMENTS

CA    2411202    11/2001

(Continued)

OTHER PUBLICATIONS

Search Report issued in connection with commonly owned European Application No. 05105731.3, mailed Nov. 18, 2005.

(Continued)

*Primary Examiner*—Michael C Miggins
(74) *Attorney, Agent, or Firm*—Marc A. Began; Wesley A. Nicolas

(57) ABSTRACT

A container consisting of a PCTFE monolayer, the thickness of said layer being about 40-100 μm, which container is equipped with a device where the liquid can be lead out through when desired and which container is transparent, shows superior properties for storing liquid pharmaceutical compositions, especially insulin compositions containing preservatives.

31 Claims, 1 Drawing Sheet

U.S. PATENT DOCUMENTS

| | | | |
|---|---|---|---|
| 5,928,213 A * | 7/1999 | Barney et al. | 604/410 |
| 5,944,709 A | 8/1999 | Barney et al. | |
| 5,945,187 A * | 8/1999 | Buch-Rasmussen et al. | 428/36.92 |
| 6,238,607 B1 | 5/2001 | Tsai et al. | |
| 6,287,652 B2 | 9/2001 | Speckhals et al. | |
| 6,306,503 B1 | 10/2001 | Tsai | |
| 6,519,241 B1 | 2/2003 | Theimer | |
| 6,572,542 B1 | 6/2003 | Houben et al. | |
| 6,713,165 B1 | 3/2004 | Karsten | |
| 2002/0007154 A1 | 1/2002 | Hansen et al. | |
| 2002/0197478 A1 | 12/2002 | Muggli et al. | |
| 2003/0008152 A1 | 1/2003 | Tsai | |
| 2003/0014014 A1 | 1/2003 | Nitzan | |
| 2003/0047467 A1 | 3/2003 | Smith et al. | |
| 2003/0203141 A1 | 10/2003 | Blum et al. | |
| 2004/0044332 A1 | 3/2004 | Stergiopulos | |
| 2005/0113650 A1 | 5/2005 | Pacione et al. | |
| 2005/0214129 A1 | 9/2005 | Greene et al. | |
| 2005/0215867 A1 | 9/2005 | Grigsby et al. | |
| 2006/0134358 A1 | 6/2006 | Madsen et al. | |
| 2008/0176789 A1 | 7/2008 | Bang | |

FOREIGN PATENT DOCUMENTS

| | | |
|---|---|---|
| CN | 1281687 | 1/2001 |
| DE | 19509632 | 3/1996 |
| DE | 19850607 | 11/1998 |
| EP | 062341 | 10/1982 |
| EP | 132583 | 2/1985 |
| EP | 898466 | 4/1997 |
| EP | 898466 | 3/1999 |
| EP | 1033326 | 3/1999 |
| EP | 1258234 | 2/2000 |
| EP | 1525873 | 4/2005 |
| FR | 2850027 | 7/2004 |
| GB | 1591247 | 6/1981 |
| JP | 54-103184 | 1/1978 |
| JP | H08-104369 | 4/1996 |
| JP | 2000-510728 | 8/2000 |
| JP | 2002-28999 | 1/2002 |
| RU | 5722957 | 1/2007 |
| WO | WO 90/01958 | 3/1990 |
| WO | 93/06158 | 9/1991 |
| WO | 93/06159 | 9/1991 |
| WO | WO 95/16565 | 6/1995 |
| WO | WO 97/42897 | 11/1997 |
| WO | WO 99/37269 | 7/1999 |
| WO | WO 00/61062 | 3/2000 |
| WO | WO 01/89607 | 11/2001 |
| WO | WO 02/40083 | 11/2001 |
| WO | WO 03/043494 | 5/2003 |
| WO | 2005/000580 | 6/2003 |
| WO | WO 03/099358 | 12/2003 |
| WO | WO 2004/098405 | 11/2004 |
| WO | WO 2005/037092 | 4/2005 |
| WO | WO 2005/087091 | 9/2005 |
| WO | WO 2007/077255 | 7/2007 |
| WO | WO 2008/058997 | 5/2008 |

OTHER PUBLICATIONS

International Search Report and Written Opinion issued in connection with commonly owned International Application No. PCT/EP2006/063395, mailed Sep. 20, 2006.
International Preliminary Examination Report issued in connection with commonly owned PCT Application No. PCT/EP2006/063395, mailed Jan. 18, 2008.
International Search Report issued in commonly owned International Application No. PCT/EP2007/062341, dated Dec. 8, 2008.
Final Rejection in U.S. Appl. No. 11/283,653, sent from the USPTO on Mar. 12, 2009.
Non-Final Office Action in U.S. Appi. No. 11/283,653, sent from the USPTO on Aug. 7, 2008.
Non-final Office Action issued by USPTO for U.S. Appl. No. 11/283,653, dated Aug. 24, 2009.
Response to Non-Final Office Action dated Aug. 24, 2009 in U.S. Appl. No. 11/283,653, submitted to USPTO Nov. 19, 2009.
Ou Yinghong et al., Handbook of Plastics, p. 364 (Feb. 1999).
English Translation of Ou Yinghong et al., Handbook of Plastics, p. 364 (Feb. 1999).
Chinese Office Action Mailed Jan. 8, 2010 in Chinese Patent Application No. 200480038550.7 to Soerensen et al.
Office Action of Mar. 11, 2010 for U.S. Appl. No. 11/283,653, filed Nov. 21, 2005, first named inventor: Nils Berg Madsen.
English Abstract of FR 2850027.
Burke, J., Waac Newsletter, vol. 14 (2), pp. 13-7 (1992).
Final Rejection in U.S. Appl. No. 11/283,653 filed Jun. 23, 2004; Inventors: Madsen et al. sent Mar. 11, 2010.
English Translation of Ou Yinghong et al., Handbook of Plastics, p. 364 (Feb. 1999).
Chinese Office Action mailed Jan. 8, 2010 in Chinese Patent Application No. 200480038550.7 to Soerensen et al.
Office Action of Mar. 11, 2010 for U.S. Appl. No. 11/283,653 filed Nov. 21, 2005, First Named Inventor: Nils Berg Madsen.
English Abstract of JP2002-28999.
English Abstract of JPH08-104369.

* cited by examiner

TRANSPARENT, FLEXIBLE, IMPERMEABLE PLASTIC CONTAINER FOR STORAGE OF PHARMACEUTICAL LIQUIDS

CROSS REFERENCE TO RELATED APPLICATIONS

This application is a continuation of international application no. PCT/DK2004/000890 filed Dec. 20, 2004 and claims priority of Danish application no. PA 2003 01916 filed Dec. 22, 2003 and U.S. provisional application Ser. No. 60/536,375 filed Jan. 14, 2004 all of which are hereby incorporated by reference.

FIELD OF THIS INVENTION

The present invention relates to a transparent plastic container which can be used to storage of liquid solutions or suspensions, for example of medicaments, optionally containing preservatives.

BACKGROUND OF THIS INVENTION

Some medicaments are delivered to the patients in solid form, other in liquid form. Often, the liquid medicaments are delivered in a container. Some containers consist only or mainly of glass, other consist only or mainly of other materials such as plastic.

Medicaments in solid form are often marketed in a glass container or a plastic container. An example of a plastic container is a blister package.

In a pharmaceutical composition in liquid form, the active ingredient is present in dissolved or suspended form. In addition to the active ingredient, a pharmaceutical composition may contain a pharmaceutically active carrier, a disintegrator, a stabilizer, or a buffer substance.

The route of administration varies between the different medicaments. Some medicaments are administered via the oral route, other are administered by injecting the medicament to the patient, for example, intravenously or subcutaneously. Many medicaments being peptides, for example, insulin and growth hormone, are administered by injections. Earlier, syringes were used for the injections. As far as insulin is concerned, it is becoming more and more common to use so called pen systems for the injections. Furthermore, the use of pumps for administration by injection may become a popular way of administrations by injections. In some of the pumps, the aqueous composition will be present in a glass reservoir or another hard reservoir, in other pumps, aqueous compositions will be present in a flexible reservoir, for example a reservoir which is wholly or mainly made of another material than glass, for example of plastic.

For many aqueous compositions, it is extremely difficult to find a non-glass material which can safely be used to store said aqueous composition until it is used by the patient. One of the many difficulties is the high mobility of preservatives in welding layer based on polymers like polyethylene (herein designated PE), polypropylene (herein designated PP), polyethylene terephtalate (herein designated PET) or the like combined with a high affinity of the preservatives to the widely used adhesives based on polyurethane used for lamination of welding layer to a moist barrier like polychlorotrifluoroethylene (herein designated PCTFE). The result of the known art is a fast and not desired reduction in the content of preservative in the medicated solution.

A main task for the inventors of this invention has been to find a material which can be used to prepare a transparent, flexible container fulfilling the safety requirements for storage of pharmaceutical solutions containing a preservative such as phenol, m-cresol and benzyl alcohol. It was extremely difficult to find a material fulfilling these requirements.

Briefly, the object of this invention is to overcome or ameliorate at least some of the disadvantages of the prior art. Hence, not all the objects mentioned below may be fully overcome or ameliorated.

A more specific object of this invention is to furnish a container or reservoir.

Another object of this invention is to furnish a flexible container.

Another object of this invention is to furnish a transparent container.

Another object of this invention is to furnish a part allowing sterilization.

Another object of this invention is to furnish a material which may be welded to itself to form the above mentioned reservoir.

Another object of this invention is to furnish a container which can be used for storage of liquid solutions or suspensions of medicaments, optionally containing preservatives.

Another object of this invention is to furnish a container which has a sufficient transparency so as to enable inspection of the content of the container.

Another object of this invention is to furnish a container which can be used to storage of liquid solutions or suspensions of medicaments, optionally containing preservatives and which container not or only to a minor degree consists of glass.

Another object of this invention is to furnish a container having barrier properties securing that the concentration of the active ingredient in the aqueous composition is not changed substantially during storage for a sufficient period of time.

Another object of this invention is to furnish a container having barrier properties securing that the concentration of any preservative present in the aqueous composition is not changed substantially during storage for a sufficient period of time.

A further object of this invention is to furnish a film for a pouch which can be used for storage of sterile water based drug formulation.

A further object of this invention is to furnish a film material for said pouch fulfilling certain functional requirements such as physical properties for the material after sterilization, chemical requirements for the material after sterilization, and cleanliness.

Hence, one object of this invention is to furnish a film material for said pouch which can be sterilized, for example, using gamma irradiation, electron beam, steam, or ethylene oxide.

A further object of this invention is to furnish a film material for said pouch which, after sterilization, fulfils most of or all the following physical requirements: 1) the material must be transparent, 2) the material must provide a good barrier against water; 3) the material must provide a good barrier against gasses (for example, oxygen and carbon dioxide); 4) the material must provide a good barrier against preservatives (for example, phenol and meta-cresol); 5) the material must provide a good barrier against odors (for example preservatives); 6) the material must be resistant against environmental stress cracking (for example, oils, perfumes); 7) the material must be resistant against flex-crack; 8) the material must have good sealing properties (for example, by welding); and 9) the material must not relax significantly during storage and use.

A further object of this invention is to furnish a film material for said pouch which, after sterilization, fulfils most of or all the following chemical requirements: 1) the material must not emit substances to the drug which can affect the health and safety of the patient (leachables); 2) the material must have a very low level of extractables; and 3) the material must be compatible with the drug formulation.

A further object of this invention is to furnish a film material for said pouch which, after sterilization, fulfils the following requirements for cleanliness: 1) it shall be possible to prepare the material under hygienic conditions; and 2) the final product must be free of dust and particles.

A further object of this invention is to furnish a film for said pouch fulfilling certain health and safety requirements, preferably most of or all the requirements mentioned in 1) European Pharmacopoeia (Ph. Eur.) 2002, $4^{th}$ edition; 2) The United States Pharmacopeia (USP) 25; 3) Japanese Pharmacopeia (JP) XIV; 4) EEC Directive 90/128+amendments "Relating to plastics materials and articles intended to come into contact with foodstuffs"; 5) Code of federal regulations (CFR) Title 21 Food and Drugs, part 170-190; 6) 111/9090/90 EN. Plastic Primary Packaging Materials. Note for Guidance; and 7) Guidance for Industry. Container Closure Systems for Packaging Human Drugs and Biologics, Chemistry, Manufacturing, and Controls Documentation. FDA, May 1999.

Definitions

A flexible item is an item that can bend or be bend easily and which does not break (unless it is bend too much). Glass is not flexible. Herein the term flexible in connection with the containers indicates that if the container is subjected to a force, for example, by being filled with a liquid, it will change its form without breaking.

Herein the term "insulin" refers to insulin from any species such as porcine insulin, bovine insulin, and human insulin and salts thereof such as zinc salts, and protamin salts as well as active derivatives of insulin, and insulin analogues. The term "active derivatives of insulin", is what a skilled art worker generally considers derivatives, vide general textbooks, for example, insulin having a substituent not present in the parent insulin molecule. The term "insulin analogues" refers to insulin wherein one or more of the amino acid residues have been exchanged with another amino acid residue and/or from which one or more amino acid residue has been deleted and/or from which one or more amino acid residue has been added with the proviso that said insulin analogue has a sufficient insulin activity. Using results from the so-called free fat cell assay, any skilled art worker, for example, a physician, knows when and which dosages to administer of the insulin analogue. Examples of insulin analogues are described in the following patents and equivalents thereto: U.S. Pat. No. 5,618,913, EP 254,516, EP 280,534, U.S. Pat. No. 5,750,497, and U.S. Pat. No. 6,011,007. Examples of specific insulin analogues are insulin aspart (i.e., $Asp^{B28}$ human insulin), insulin lispro (i.e., $LyS^{B28}, Pro^{B29}$ human insulin), and insulin glargin (i.e., $Gly^{A21}, Arg^{B31}, Arg^{B32}$ human insulin). Herein, the term insulin also covers compounds which can be considered being both an insulin derivative and an insulin analogue. Examples of such compounds are described in the following patents and equivalents thereto: U.S. Pat. No. 5,750,497, and U.S. Pat. No. 6,011,007. An example of a specific insulin analogue and derivative is insulin detemir (i.e., des-$Thr^{B30}$ human insulin γ $Lys^{B29}$ tetradecanoyl).

The term "U", when used herein, refers to insulin units. Most of the currently used (marketed) insulins (bovine, porcine, human, lispro, aspart, and glargine) have a potency of one unit which equals 6 nmol. Long-acting acylated insulins have reduced potency compared to human insulin. Thus, for insulin detemir one unit corresponds to 24 nmol. For other insulins, the relation between U and nmol can be determined, if not known already, for example, by determining the amount giving a similar pharmacological (blood glucose lowering) effect as that of human insulin.

Herein PE designates polyethylene and PE designates polypropylene. Conveniently, PE consists of at least 75%, preferably at least 90%, more preferred at least 95%, (weight/weight) of polyethylene. Conveniently, PP consists of at least 75%, preferably at least 90%, more preferred at least 95%, (weight/weight) of polypropylene.

In a preferred embodiment of this invention, PE is as defined in European Pharmacopoeia 2001, $4^{th}$ Edition, point 3.1.5, the content of which is hereby incorporated by reference. Examples of components present in PE are higher alkene homologues ($C_3$ to $C_{10}$) and other additives mentioned therein.

In a preferred embodiment of this invention, PP is as defined in European Pharmacopoeia 2001, $4^{th}$ Edition, point 3.1.6, the content of which is hereby incorporated by reference. Briefly, PP consists of the homopolymer of propylene or of a copolymer of propylene with not more than 25% of ethylene or a mixture (alloy) of polypropylene with not more than 25% of polyethylene. It may contain additives, vide the above point 3.1.6.

Conveniently, PCTFE consists of at least 75%, preferably at least 90%, more preferred at least 95%, (weight/weight) of polyethylene.

SUMMARY OF THE INVENTION

Figure 1:
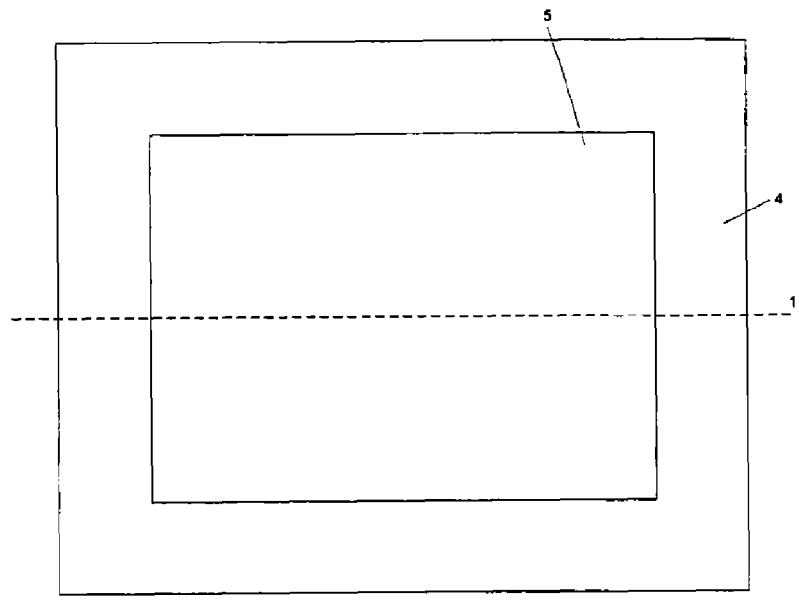
FIG. 1 shows one side of the flexible container. In this figure, the welding layer 4 secures that the container is tight. The inner of the container 5 may be filled with a liquid.
Figure 2:
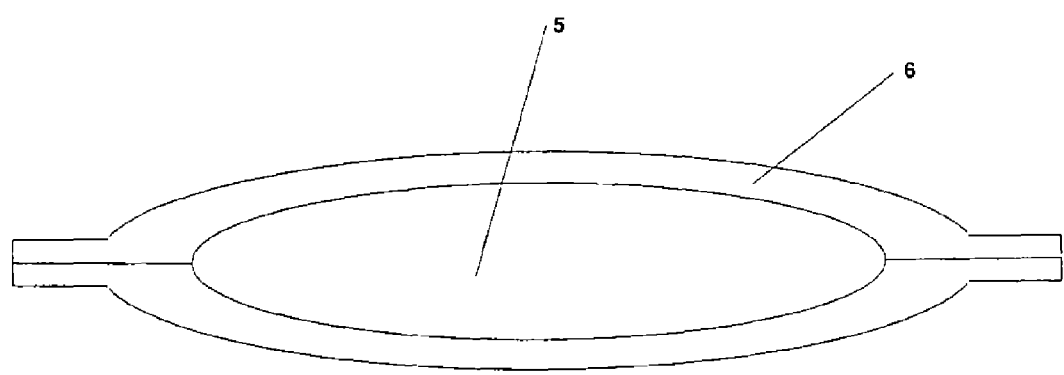
FIG. 2 is a view taken at the line 1-1 in FIG. 1 perpendicular to the surface shown in FIG. 1. The wall of the container 6 is welded together.

Briefly, this invention relates to a flexible, transparent, water-tight chamber comprised of a PCTFE film wherein said film is formed into a transparent pouch and wherein the pouch is sufficiently moisture proof, phenol proof and m-cresol proof to allow for extended storage of a medicament containing water, phenol and/or m-cresol without significant changes in concentration of water, phenol, and m-cresol occurring over the extended time period and wherein the pouch is radiation sterilisable.

In another aspect, this invention relates to a method for storing a liquid solution and/or suspension of insulin for a significant period of time for use in a delivery device, the method comprising the steps of forming a pouch from a transparent polymer film, the film being sufficiently water resistant, phenol resistant, and m-cresol resistant to allow the insulin to age for two years without degradation of its pharmaceutical properties; sterilizing the pouch; and inserting the insulin compound into the pouch for storage for a significant period of time.

DETAILED DESCRIPTION OF THIS INVENTION

Surprisingly, it has been found that a container described in the claims below fulfills the requirements set to a container which is to be used for storage of an aqueous solution.

In one aspect, this invention relates to a flexible, at least partially transparent container for storage of a liquid in a water-tight chamber, the wall material of which chamber comprises a PCTFE monolayer, characterized in that when said chamber is filled with water and when it is stored at a temperature of about 5° C. for 2 years less than 10% (weight/weight) of the content of water diffuses out from the container; and when said chamber is filled with water containing about 1.8 mg/mL (19 mM) of phenol and when it is stored at a temperature of about 5° C. for 24 months, the change in the concentration of phenol in the liquid is less than about 10%.

In another aspect, this invention relates to a flexible, at least partially transparent container for storage of a liquid in a water-tight chamber, the wall material of which chamber comprises a PCTFE monolayer, characterized in that when said chamber is filled with water and when it is stored at a temperature of about 5° C. for 2 years less than 10% (weight/weight) of the content of water diffuses out from the container; and when said chamber is filled with water containing about 1.8 mg/mL (19 mM) of phenol and when it is stored at a temperature of about 37° C. for 12 weeks, the change in the concentration of phenol in the liquid is less than about 10%.

In another aspect, this invention relates to a flexible, at least partially transparent container for storage of a liquid in a water-tight chamber, the wall material of which chamber comprises a PCTFE monolayer, characterized in that when said chamber is filled with water and when it is stored at a temperature of about 5° C. for 2 years less than 10% (weight/weight) of the content of water diffuses out from the container; and when said chamber is filled with water containing 2.06 mg/mL (19 mM) of m-cresol and when stored at a temperature of about 5° C. for 24 months, the change in the concentration of m-cresol is less than about 10%.

In another aspect, this invention relates to a flexible, at least partially transparent container for storage of a liquid in a water-tight chamber, the wall material of which chamber comprises a PCTFE monolayer, characterized in that when said chamber is filled with water and when it is stored at a temperature of about 5° C. for 2 years less than 10% (weight/weight) of the content of water diffuses out from the container; and when said chamber is filled with water containing 2.06 mg/mL (19 mM) of m-cresol and when stored at a temperature of about 37° C. for 12 weeks, the change in the concentration of m-cresol is less than about 10%.

In another aspect, this invention relates to a flexible, at least partially transparent container for storage of a liquid in a water-tight chamber, the wall material of which chamber comprises a PCTFE monolayer, characterized in that the thickness of the wall material being above about 40 μm, and being below about 100 μm, preferably below about 75 μm.

In another aspect, this invention relates to a container for storage of a liquid in a water-tight chamber, the thickness of the wall material being above about 40 μm, and being below about 100 μm, preferably below about 75 μm.

In one embodiment, this invention relates to a container as described above, wherein the layer is weldable.

In another embodiment, this invention relates to a container as described above, which is at least partially transparent.

In another embodiment, this invention relates to a container as described above, which is wholly transparent.

In another embodiment, this invention relates to a container as described above, from which when filled with water and when stored at a temperature of about 5° C. for 2 years less than 10%, preferably less than 5%, more preferred less than 2%, (weight/weight) of the content of water diffuses out from the container.

In another embodiment, this invention relates to a container as described above, from which when filled with water containing about 1.8 mg/mL (19 mM) of phenol and when stored at a temperature of about 5° C. for 24 months, the change in the concentration of phenol is less than about 10% preferably less than about 5%, more preferred less than about 2%.

In another embodiment, this invention relates to a container as described above, from which when filled with water containing about 1.8 mg/mL (19 mM) of phenol and when stored at a temperature of about 37° C. for 12 weeks, the change in the concentration of phenol is less than about 10%, preferably less than about 5%, more preferred less than about 2%.

In another embodiment, this invention relates to a container as described above, from which when filled with water containing 2.06 mg/mL (19 mM) of m-cresol and when stored at a temperature of about 5° C. for 24 months, the change in the concentration of m-cresol is less than about 10%, preferably less than about 5%, more preferred less than about 2%.

In another embodiment, this invention relates to a container as described above, from which when filled with water containing 2.06 mg/mL (19 mM) of m-cresol and when stored at a temperature of about 37° C. for 12 weeks, the change in the concentration of m-cresol is less than about 10%, preferably less than about 5%, more preferred less than about 2%.

In another embodiment, this invention relates to a container as described above, which is prepared from a pouch foil which when tested by test A described herein gives a maximum loss of m-cresol of about 10%, preferably not more than about 5%.

In another embodiment, this invention relates to a container as described above, which is prepared from a pouch foil which when tested by test A described herein gives a change in the pH value which is than about +/−0.2.

In another embodiment, this invention relates to a container as described above, which is prepared from a pouch foil which when tested by test B described herein gives a maximum weight loss of about 2.5%, preferably not more than about 1%.

In another embodiment, this invention relates to a container as described above, which is prepared from a pouch foil which when tested by test B described herein gives a maximum loss of m-cresol of about 10%, preferably not more than about 5%.

In another embodiment, this invention relates to a container as described above, which is prepared from a pouch foil which when tested by test B described herein gives a change in the pH value which is more than about +/−0.2.

In another embodiment, this invention relates to a container as described above, which is prepared from a pouch foil which when tested by test C described herein gives a maximum weight loss of 2.5%, preferably not more than about 2%.

In another embodiment, this invention relates to a container as described above, which is prepared from a pouch foil which when tested by test C described herein gives a maximum loss of m-cresol of about 10%, preferably not more than about 5%.

In another embodiment, this invention relates to a container as described above, which is prepared from a pouch foil which when tested by test C described herein gives a maximum loss of phenol of about 10%, preferably not more than about 5%.

In another embodiment, this invention relates to a container as described above, which is prepared from a pouch foil which when tested by test C described herein gives a change in the pH value which is not more than about +/−0.2.

In another embodiment, this invention relates to a container as described above, which is prepared from a pouch foil which fulfills test D described herein for the dilution 1:50, preferably the dilution 1:100, more preferred the dilution 1:200, even more preferred the dilution 1:400.

In another embodiment, this invention relates to a container as described above, which is flexible.

In another embodiment, this invention relates to a container as described above, which container is equipped with a device whereby said liquid can be expelled from said container.

In another embodiment, this invention relates to a container as described above, wherein a second polymeric layer is added on a part of the outer side of the PCTFE layer or on the whole side thereof.

In another embodiment, this invention relates to a container as described above, which container, when completely filled with liquid, can contain an amount of liquid which is at least about 0.5 ml, preferably at least about 1 ml, and not more than about 10 ml, preferably not more than about 5 ml, more preferred not more than about 3 ml and, preferably, the volume is about 2.5 ml.

In another aspect, this invention relates to a use of a container as described above for storing a liquid pharmaceutical composition mentioned in any of the preceding claims.

In another embodiment, this invention relates to a container as described above filled partially or wholly with a liquid pharmaceutical composition.

In another embodiment, this invention relates to a container as described above wherein at least 95% (volume/volume), preferably at least 98% (volume/volume), more preferred at least 99% (volume/volume), and even more preferred at least 99.9% (volume/volume), of the inner of the container contains the liquid pharmaceutical composition In another embodiment, this invention relates to a container as described above filled partially or wholly with a liquid pharmaceutical composition wherein the active ingredient is a peptide.

In another embodiment, this invention relates to a container as described above wherein the peptide is insulin.

In another embodiment of this invention, the active ingredient in said pharmaceutical composition is growth hormone or factor VII and analogs thereof.

In another embodiment, this invention relates to a container as described above wherein the content of insulin is in the range from about 10 U/ml to about 1500 U/ml.

In another embodiment, this invention relates to a container as described above containing a preservative.

In another embodiment, this invention relates to a container as described above filled partially or wholly with a liquid pharmaceutical composition containing phenol.

In another embodiment, this invention relates to a container as described above filled partially or wholly with a liquid pharmaceutical composition containing m-cresol.

In another embodiment, this invention relates to a container as described above filled partially or wholly with a liquid pharmaceutical composition containing benzyl alcohol.

In another aspect, this invention relates to a PCTFE film, characterized in that the film material can be used for preparing a transparent container as described above.

In a preferred embodiment of this invention, the PCTFE layer consisting of at least 75%, preferably at least 90%, more preferred at least 95%, (weight/weight) of a polychlorotrifluoroethylene film, for example Aclar® from Honeywell, Morris Town, N.J., USA.

Another polymeric layer may be added to the outer side of the PCTFE layer. Examples of such a layer are PE, PP, PET-G (polyethylene pthereptate glycerol modified), and TPE (thermoplastic elastomer), allowing welding from the outside of the reservoir.

In a preferred embodiment of this invention, the thickness of the PCTFE layer is at least about 20 μm, preferably at least about 30 μm, and the thickness of the PCTFE layer is not more than about 100 μm, preferably not more than about 75 μm.

The container according to this invention must have a flexibility which allows filling of the container so that it can be used as a pouch.

If the aqueous composition contains a preservative it is important that the concentration thereof is sufficient to maintain an antimicrobiological efficacy.

As mentioned above, the known PCTFE containers cannot be used for storing of medicaments containing preservatives such as phenol, m-cresol or benzyl alcohol. When preparing the containers of this invention, it is important to use a procedure for sealing the container which does not have an adverse influence of the final container. On way of doing this is to avoid the use of an adhesive layer, for example, by welding the PCTFE layers together. Hence, in one embodiment, the container of this invention does not have an adhesive layer. In other words, the container of this invention is sealed by welding.

In a preferred embodiment, the container of this invention consists of a PCTFE material which enables sterilization of the container in a convenient way, for example, by β or γ irradiation or by heating.

In a preferred embodiment, the container of this invention consists of a PCTFE material which fulfills the following test for flexibility: Two rectangular pieces of the material being tested both having the size 60 mm×20 mm are welded together with a 3 mm welding zone forming a welded test pouch and, thereafter, 1.5 ml of water is filled into the pouch. If the over-pressure is below 100 mBar, the material has a sufficient flexibility.

In another preferred embodiment, the container of this invention consists of a PCTFE material which fulfills the following test for flexibility: Two rectangular pieces of the material being tested both having the size 60 mm×20 mm are welded together with a 2 mm welding zone forming a welded test pouch and, thereafter, 1.5 ml of water is filled into the pouch. If the over-pressure is below 100 mBar, the material has a sufficient flexibility.

In a preferred embodiment of this invention, the container of this invention is to be used for storage of an aqueous pharmaceutical composition.

In a preferred embodiment of this invention, the active ingredient in said pharmaceutical composition is a protein. In a further preferred embodiment of this invention, the active ingredient is insulin or growth hormone. In a preferred embodiment of this invention, the amount of insulin in the aqueous solution is in the range with the lower limit being 10 U/ml, preferably 40 U/ml, more preferred 100 U/ml, and even more preferred 150 U/ml, and the upper limit being 1500 U/ml, preferably 1000 U/ml, more preferred 500 U/ml, even more preferred 300 U/ml.

In a preferred embodiment of this invention, the aqueous formulation contains a stabilizer. In a more preferred embodiment of this invention, the aqueous formulation contains phenol. In another preferred embodiment of this invention, the aqueous formulation contains m-cresol. In another preferred embodiment of this invention, the aqueous formulation contains benzyl alcohol. In a further preferred embodiment of this invention, the total concentration of phenol and/or m-cresol in the aqueous formulation is in the range from about 20 mM to about 50 mM, preferably in the range from about 30 mM to about 45 mM. The concentration of phenol and/or m-cresol is, inter alia, depending on the concentration of insulin in the aqueous formulation. In a preferred embodiment of this invention, the amount of phenol in the aqueous solution is in the range from about 15 to about 25 mM. In another preferred embodiment of this invention, the amount of m-cresol in the aqueous solution is in the range from about 15 to about 25 mM. In another preferred embodiment of this invention, the amount of benzyl alcohol in the aqueous formulation is in the range from about 15 to about 25 mM. In another preferred embodiment of this invention, there is no benzyl alcohol present in the aqueous formulation.

When electing the PCTFE material which is to be used for the preparation of the container of this invention, it is important to elect a material which do not absorb too much of the active ingredient and of the other ingredients present in the aqueous pharmaceutical composition.

As mentioned in the claims below, the container of this invention may be equipped with a device whereby said liquid can be expelled from said container (when desired). An example of such a device can be a septum for needle penetration in the form of a rubber material adhered to the inside or the outside of the container foil or in the welding zone between the two foils. Another example can be an active or a passive closure valve adhered to the container. The container of this invention may be emptied by application on external pressure to the reservoir or by suction from a pump device.

The container of this invention can be used in many devices, for example, a pump, a syringe, or a pen like syringe. Conveniently, the container of this invention is disposable.

This invention also relates to a PCTFE film which film material can be used for preparing a transparent container according to this invention. In a preferred embodiment of this invention, the PCTFE film covered by this invention can be used directly to prepare the containers claimed herein. For example, the PCTFE film covered by this invention shall not be processed so that a further film is attached to the whole of one of the two surfaces.

The mentioning herein of references is no admission that they constitute prior art.

Herein, the word "comprise" is to be interpreted broadly meaning "include", "contain" or "comprehend" (vide Guidelines for Examination in the European Patent Office 2000, part C, chapter III, 4.13).

Test Methods

In a preferred embodiment, the container of this invention is prepared from pouch foils fulfilling some or all of the following tests:

Test A

Test for loss of m-cresol and pH change:

10 cm² (2×5 cm²) of the foil is cut into 15 minor parts sized (0.7×1 cm²) and immersed into 1.5 ml of a solution containing about 1.80 mg/mL (19 mM) phenol, 2.06 mg/mL (19 mM) m-cresol, 16.0 mg/mL (174 mM) glycerol, 1.25 mg/mL (7 mM) disodium hydrogenphosphat, 0.58 mg/mL (10 mM) sodium chloride and pH: 7.40. The immersed sample and a reference sample are placed in an incubator at 37° C. for 1 week.

The content of m-cresol in the solution is analyzed by using a chromatographic method.

This test will show the total migration of m-cresol including the absorption directly into the edge. When stored at the above mentioned conditions, the following requirement should be fulfill: The maximum loss of m-cresol should be 10% and preferred less than 5%. The pH value of the solution should not change more than +/−0.2.

Test B

Test for permeation, loss of m-cresol and pH:

Paddington cup test method modified from DS/EN 13726-2.

In this method, a foil in test is placed between two flanges allowing 10 cm² of the foil to be in contact with 5 ml of a solution containing phenol:about 1.80 mg/mL (19 mM), m-cresol: 2.06 mg/mL (19 mM), glycerol:16.0 mg/mL (174 mM), disodiumhydrogenphosphat:1.25 mg/mL (7 mM), sodium chloride: 0.58 mg/mL (10 mM), and pH: 7.40. The Paddington cup is placed upside down allowing direct contact between the solution and the foil in an incubator at 37° C. and a relative humidity of max. 15% for 1 week along with a reference sample consisting of a Paddington cup with an inert aluminum foil. The Paddington cups are weighed before and after the storage. The content of m-cresol is analyzed by using a chromatographic method. This test is useful to test the total evaporation and will show the barrier properties against preservatives like m-cresol and phenol. When stored at the above mentioned conditions, the following requirement should be fulfilled: The maximum weight loss should be 2.5% preferred less than 1%, the maximum loss of m-cresol should be 10% and preferred less than 5%, and the pH value should not change more than +/−0.2.

Test C

Test of Pouches with Vehicle.

In this test, pouches are produced by welding the foil and by filling the pouches with vehicle. Some pouches are weighed before storage at 37° C. and a relative humidity of 15% and weighed after up till 12 weeks. Some pouches are stored at 37° C. and tested for content of m-cresol and phenol at regular intervals up to 12 weeks. Glass vials are used as a reference. When stored at the above mentioned conditions for 12 weeks, the following requirement should be fulfilled: The maximum weight loss shall be not more than 2.5%, preferred not more than 2%, the maximum loss of m-cresol shall be not more than 10% and preferred not more than 5%, the maximum loss of phenol shall be not more than 10% and preferred not more than 5%. The pH value should not change more than +/−0.2.

Test D

Transparency of a Filled Pouch.

A filled pouch must fulfill the transparency requirement in the European Pharmacopoeia 2001, 4$^{th}$ Edition, part 3.2.2.1 concerning plastic containers for aqueous solutions for parenteral infusion. In this method, solution S is diluted 1:200 (for PE or PP) or 1:400 for other containers. This test can be modified by testing solution S diluted 1:50 or 1:100.

The following example is offered by way of illustration, not by limitation.

EXAMPLE 1

A PCTFE foil having a thickness of 55 μm is welded at a temperature of 300° C. at a pressure of 3.5 bar for 4 seconds to form a container with the size 60 mm×20 mm having a welding seam width of 2 mm.

Test A on the foil: The loss of m-cresol was 0.2%. The pH value changed from 7.44 to 7.43.

Test B on the foil: The loss of m-cresol was 0%. The weight loss was 0%. The pH value changed from 7.44 to 7.40.

Test D on the foil: Fulfils the requirements, both in 1:200 and 1:400 dilutions.

EXAMPLE 2

An experimental multilayer film consisting of 50 mµ PE and 51 mµ PCTFE (with a tie layer), made according to patent application no. PCT/BE 03/000226 by Tekni-Plex Europe N.V., was tested under confidentiality agreement by test C mentioned above. In this test C, the PCTFE sides of this multilayer film were welded together. The result of these tests was as follows: The weight loss was 0.44%. The loss of m-cresol was about 0%. The loss of phenol was about 0%. The pH value changed from 7.43 to 7.32 for test vehicle.

What is claimed is:

1. A flexible, at least partially transparent container for storage of a liquid in a water-tight chamber, the container comprising:
    a liquid pharmaceutical composition comprising, an active ingredient and at least one preservative selected from the group consisting of phenol, m-cresol, and benzyl alcohol;
    the container wall material (6) consisting essentially of a weldable PCTFE monolayer, forming a chamber (5) wherein when the chamber is filled with water and when it is stored at a temperature of about 5° C. for 2 years less than 10% (weight/weight) of the content of water diffuses out from the container; and when said chamber is filled with water containing about 1.8 mg/mL (19 mM) of phenol and when it is stored at a temperature of about 5° C. for 24 months, the change in the concentration of phenol in the liquid is less than about 10%.

2. A PCTFE film, wherein the film material can be used for preparing a transparent container according to claim 1.

3. The container according to claim 1, wherein the thickness of the wall material being above about 40 µm, and being below about 100 µm.

4. The container according to claim 3 wherein the container is at least partially transparent.

5. The container according to claim 4 wherein the container is wholly transparent.

6. The container according to claim 5, from which when filled with water and when stored at a temperature of about 5° C. for 2 years less than 10%.

7. The container according to claim 6, from which when filled with water containing about 1.8 mg/mL (19 mM) of phenol and when stored at a temperature of about 5° C. for 24 months, the change in the concentration of phenol is less than about 10%.

8. The container according to claim 7, from which when filled with water containing about 1.8 mg/mL (19 mM) of phenol and when stored at a temperature of about 37° C. for 12 weeks, the change in the concentration of phenol is less than about 10%.

9. The container according to claim 8, from which when filled with water containing 2.06 mg/mL (19 mM) of m-cresol and when stored at a temperature of about 5° C. for 24 months, the change in the concentration of m-cresol is less than about 10%.

10. The container according to claim 9, from which when filled with water containing 2.06 mg/mL (19 mM) of m-cresol and when stored at a temperature of about 37° C. for 12 weeks, the change in the concentration of m-cresol is less than about 10%.

11. The container according to claim 10, which is prepared from a pouch foil which when tested by test A described herein gives a maximum loss of m-cresol of about 10%.

12. The container according to claim 11, which is prepared from a pouch foil which when tested by test A described herein gives a change in the pH value which is not more than about +/−0.2.

13. The container according to claim 12, which is prepared from a pouch foil which when tested by test B described herein gives a maximum weight loss of about 2.5%.

14. The container according to claim 13, which is prepared from a pouch foil which when tested by test B described herein gives a maximum loss of m-cresol of about 10%.

15. The container according to claim 14, which is prepared from a pouch foil which when tested by test B described herein gives a change in the pH value which is not more than about +/−0.2.

16. The container according to claim 15, which is prepared from a pouch foil which when tested by test C described herein gives a maximum weight loss of 2.5%.

17. The container according to claim 16, which is prepared from a pouch foil which when tested by test C described herein gives a maximum loss of m-cresol of about 10%.

18. The container according to claim 17 which is prepared from a pouch foil which when tested by test C described herein gives a maximum loss of phenol of about 10%.

19. The container according to claim 18, which is prepared from a pouch foil which when tested by test C described herein gives a change in the pH value which is not more than about +/−0.2.

20. The container according to acclaim 19 which is prepared from a pouch foil which fulfills test D described herein for the dilution 1:50.

21. The container according to claim 20, which container is equipped with a device whereby said liquid can be expelled from said container.

22. The container according to claim 21, which container, when completely filled with liquid, can contain an amount of liquid which is at least about 0.5 ml, and not more than about 10 ml.

23. A container according to claim 22, wherein the container is filled partially or wholly with the liquid pharmaceutical composition.

24. A container according to claim 23 wherein at least 95% (volume/volume) of the inner of the container contains the liquid pharmaceutical composition.

25. The container according to claim 24, wherein the active ingredient is a peptide.

26. The container according to claim 25 wherein the peptide is insulin.

27. The container according to claim 26 wherein the content of insulin is in the range from about 10 U/ml to about 1500 U/ml.

28. A flexible, at least partially transparent container for storage of a liquid in a water-tight chamber, the container comprising:
    a liquid pharmaceutical composition comprising, an active ingredient and at least one preservative selected from the group consisting of phenol, m-cresol, and benzyl alcohol;
    the container wall material (6) consisting essentially of a weldable PCTFE monolayer, forming a chamber (5) wherein when the chamber is filled with water and when it is stored at a temperature of about 5° C. for 2 years less than 10% (weight/weight) of the content of water diffuses out from the container; and when said chamber is filled with water containing about 1.8 mg/mL (19 mM) of phenol and when it is stored at a temperature of about 37° C. for 12 weeks, the change in the concentration of phenol in the liquid is less than about 10%.

29. A flexible, at least partially transparent container for storage of a liquid in a water-tight chamber, the container comprising:
  a liquid pharmaceutical composition comprising, an active ingredient and at least one preservative selected from the group consisting of phenol, m-cresol, and benzyl alcohol;
  the container wall material (6) consisting essentially of a weldable PCTFE monolayer, forming a chamber (5) wherein when the chamber is filled with water and when it is stored at a temperature of about 5° C. for 2 years less than 10% (weight/weight) of the content of water diffuses out from the container; and when said chamber is filled with water containing 2.06 mg/mL (19 mM) of m-cresol and when stored at a temperature of about 5° C. for 24 months, the change in the concentration of m-cresol is less than about 10%.

30. A flexible, at least partially transparent container for storage of a liquid in a water-tight chamber, the container comprising:
  a liquid pharmaceutical composition comprising, an active ingredient and at least one preservative selected from the group consisting of phenol, m-cresol, and benzyl alcohol;
  the container wall material (6) consisting essentially of a weldable PCTFE monolayer, forming a chamber (5) wherein when the chamber is filled with water and when it is stored at a temperature of about 5° C. for 2 years less than 10% (weight/weight) of the content of water diffuses out from the container; and when said chamber is filled with water containing 2.06 mg/mL (19 mM) of m-cresol and when stored at a temperature of about 37° C. for 12 weeks, the change in the concentration of m-cresol is less than about 10%.

31. A flexible, at least partially transparent container for storage of a liquid in a water-tight chamber, the container comprising:
  a liquid pharmaceutical composition comprising, an active ingredient and at least one preservative selected from the group consisting of phenol, m-cresol, and benzyl alcohol;
  the container wall material (6) consisting essentially of a weldable PCTFE monolayer, forming a chamber (5) wherein the thickness of the wall material being above about 40 µm, and being below about 100 µm.

* * * * *

UNITED STATES PATENT AND TRADEMARK OFFICE
CERTIFICATE OF CORRECTION

PATENT NO.        : 7,807,242 B2                                    Page 1 of 1
APPLICATION NO.   : 11/472831
DATED             : October 5, 2010
INVENTOR(S)       : Soerensen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this
Fifteenth Day of February, 2011

David J. Kappos
*Director of the United States Patent and Trademark Office*